United States Patent
Tamura et al.

(10) Patent No.: US 9,934,916 B2
(45) Date of Patent: Apr. 3, 2018

(54) KEYBOARD FOR PORTABLE INFORMATION EQUIPMENT

(71) Applicant: LENOVO (SINGAPORE) PTE. LTD., Singapore (SG)

(72) Inventors: Fumio Tamura, Tokyo (JP); Hiroaki Agata, Kanagawa-ken (JP); Takane Fujino, Kanagawa-ken (JP); Eiji Shinohara, Kanagawa-ken (JP)

(73) Assignee: Lenovo (Singapore) PTE LTD, Singapore (SG)

( * ) Notice: Subject to any disclaimer, the term of this patent is extended or adjusted under 35 U.S.C. 154(b) by 2 days.

(21) Appl. No.: 15/153,497

(22) Filed: May 12, 2016

(65) Prior Publication Data

US 2016/0334835 A1 Nov. 17, 2016

(30) Foreign Application Priority Data

May 12, 2015 (JP) .................... 2015-97250

(51) Int. Cl.
| | |
|---|---|
| *G06F 1/16* | (2006.01) |
| *H05K 5/00* | (2006.01) |
| *H05K 7/00* | (2006.01) |
| *H01H 13/705* | (2006.01) |
| *H01H 13/10* | (2006.01) |
| *H01H 13/86* | (2006.01) |

(52) U.S. Cl.
CPC ......... *H01H 13/705* (2013.01); *G06F 1/1616* (2013.01); *G06F 1/1666* (2013.01); *H01H 13/10* (2013.01); *H01H 13/86* (2013.01)

(58) Field of Classification Search
CPC .... G06F 1/1618; G06F 1/1624; G06F 1/1616; G06F 1/1666; H01H 13/705; H01H 13/10; H01H 13/86
USPC .................................. 361/679.08–679.17
See application file for complete search history.

(56) References Cited

U.S. PATENT DOCUMENTS

| | | | |
|---|---|---|---|
| 7,034,718 B2 * | 4/2006 | Hsu ........................ | G06F 1/1616 200/344 |
| 8,885,330 B2 * | 11/2014 | Tseng .................... | G06F 1/1662 341/22 |
| 9,678,535 B2 * | 6/2017 | Senatori ................ | G06F 1/1618 |

FOREIGN PATENT DOCUMENTS

| | | | |
|---|---|---|---|
| JP | 05298000 | A | 11/1993 |
| JP | 09106318 | A | 4/1997 |
| JP | 2002-108536 | A | 4/2002 |
| JP | 2002-229709 | A | 8/2002 |

(Continued)

*Primary Examiner* — Anthony Haughton
(74) *Attorney, Agent, or Firm* — Russell Ng PLLC; Antony P. Ng

(57) ABSTRACT

A keyboard device for a portable computer is disclosed. The portable computer includes a main body chassis and a display chassis. The main body chassis contains the keyboard device having multiple keycaps elastically supported to be moved up and down. Coupled to the main body chassis via a hinge, the display chassis contains a display. The main body chassis also includes a key depressing mechanism having a rotating shaft member provided along each of the keycaps and a pressing piece projecting from the outer circumferential surface of the rotating shaft member to the side of the keycap to allow a receiving part provided in the keycap to be depressed downward. The rotating shaft member rotates about the axis to cause the pressing piece to push down the receiving part and, in turn, pushing down and keeping the keycap in a depressed position.

12 Claims, 10 Drawing Sheets

(56) References Cited

FOREIGN PATENT DOCUMENTS

| | | |
|---|---|---|
| JP | 2014-120098 A | 6/2014 |
| JP | 2014-174999 A | 9/2014 |
| JP | 2015-69296 A | 4/2015 |
| WO | 2015/030713 A1 | 3/2015 |

* cited by examiner

KEYBOARD FOR PORTABLE INFORMATION EQUIPMENT

PRIORITY CLAIM

The present application claims benefit of priority under 35 U.S.C. § § 120, 365 to the previously filed Japanese Patent Application No. JP2015-97250 with a priority date of May 12, 2015, which is incorporated by reference herein.

BACKGROUND OF THE INVENTION

1. Technical Field

The present invention relates to keyboards in general, and particularly to a keyboard for portable information equipment.

2. Description of Related Art

The thickness of portable information equipment, such as a laptop personal computer (laptop PC) configured such that a display chassis can be opened/closed from a 0 degree position to a 180 degree position relative to a main body chassis, or a convertible tablet personal computer (convertible PC) configured such that a display chassis can be turned over from the 0 degree position to a 360 degree position relative to the main body chassis, has been rapidly reduced in recent years.

In general, a keyboard device having multiple keycaps elastically supported to be movable up and down is mounted in the main body chassis of such a type of portable information equipment. In order to ensure high operability, a certain key-stroke level needs to be secured in such a keyboard device. Therefore, the keyboard device itself is required to have a certain degree of thickness so that the interference of a display with the keyboard device on the top face of the main body chassis will be avoided when the display chassis is closed, and this is a barrier to making the portable information equipment thin.

For example, one prior art discloses a configuration in which a depressed member coupled to each keycap is provided in a keyboard device on the side of a main body chassis so that a pressing protrusion will protrude toward the inner face of a display chassis in portable information equipment such as a laptop PC. With this configuration, since the protrusion presses and pushes down the depressed member when the display chassis is closed, each keycap is also pushed down. This prevents interference between the display and the keycap in order to reduce thickness of the portable information equipment.

However, since the protrusion is provided on the inner face of the display chassis, the quality in the appearance of the product is spoiled. In addition, since the protrusion that protrudes from the display chassis directly pushes the keycap down, a large load is required immediately before the display chassis is closed to the 0 degree position, and hence there is concern about the generation of impact noise. Further, since the keycaps are pushed down only when the display chassis is closed, the keycaps cannot be pushed down and stored, for example, at the 360 degree position of a convertible PC.

Another prior art discloses a structure in which a leaf spring sheet having multiple leaf springs each coupled to each keycap is provided on the bottom face of a keyboard device, and this leaf spring sheet is slid by using the turning force of a display chassis to move each keycap up and down. The structure is to push down each keycap forcibly by the leaf spring of the leaf spring sheet slid by the turning of the display chassis while causing a force pulling in the front-rear direction to act on each keycap. Therefore, a large load is required to slide the leaf spring sheet to make the load on hinges very large to couple the display chassis and the main body chassis together. As a result, there is concern about damage to each part, and hence it is necessary to make each part large and strong in order to prevent the damage, but it also counters to the goal of making the portable information equipment thin.

Consequently, it would be desirable to provide an improved keyboard for portable information equipment.

SUMMARY OF THE INVENTION

In accordance with a preferred embodiment of the present invention, portable information equipment includes a main body chassis and a display chassis. The main body chassis contains a keyboard device having multiple keycaps elastically supported to be moved up and down. Coupled to the main body chassis via a hinge, the display chassis contains a display. The main body chassis also includes a key depressing mechanism having a rotating shaft member provided along each of the keycaps and a pressing piece projecting from the outer circumferential surface of the rotating shaft member to the side of the keycap to allow a receiving part provided in the keycap to be depressed downward. The rotating shaft member rotates about the axis to cause the pressing piece to push down the receiving part and, in turn, pushing down and keeping the keycap in a depressed position.

All features and advantages of the present disclosure will become apparent in the following detailed written description.

BRIEF DESCRIPTION OF THE DRAWINGS

The disclosure itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
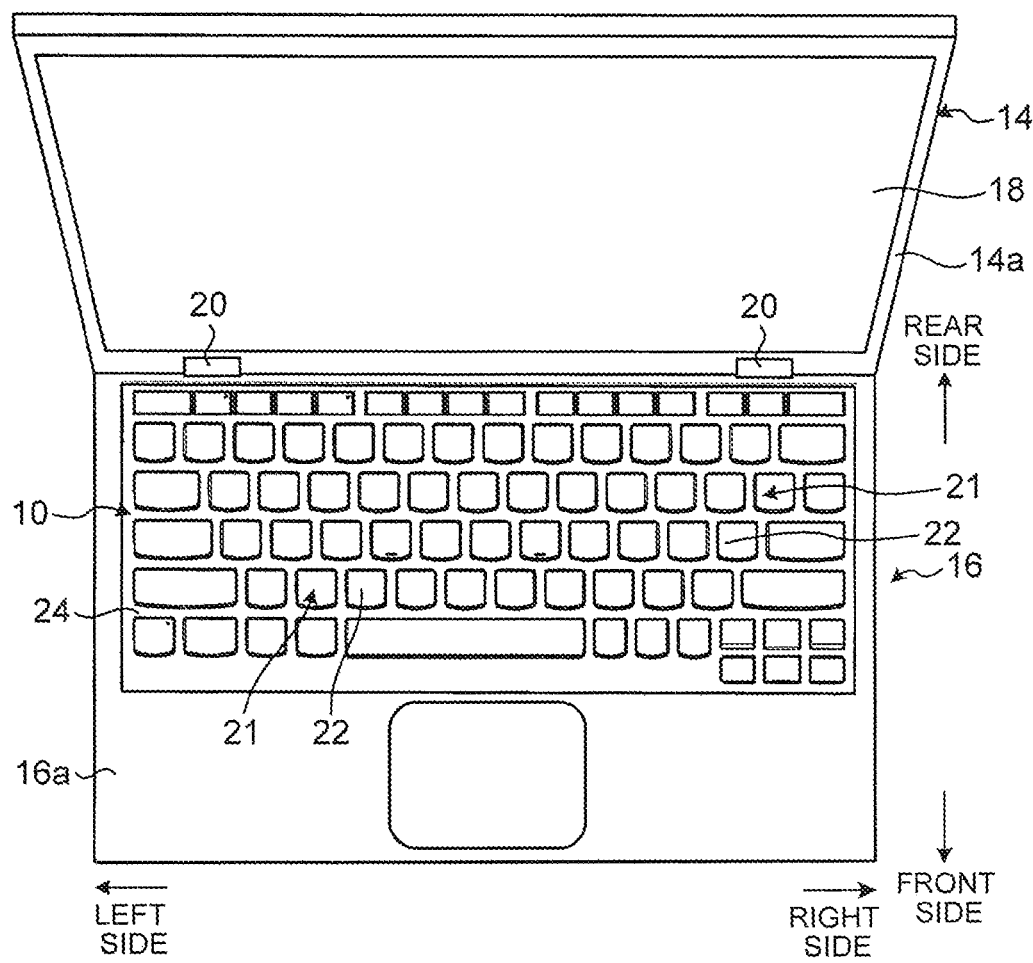
FIG. 1 is a plan view of a portable computer having a keyboard device in accordance with a preferred embodiment of the present invention.
Figure 2:
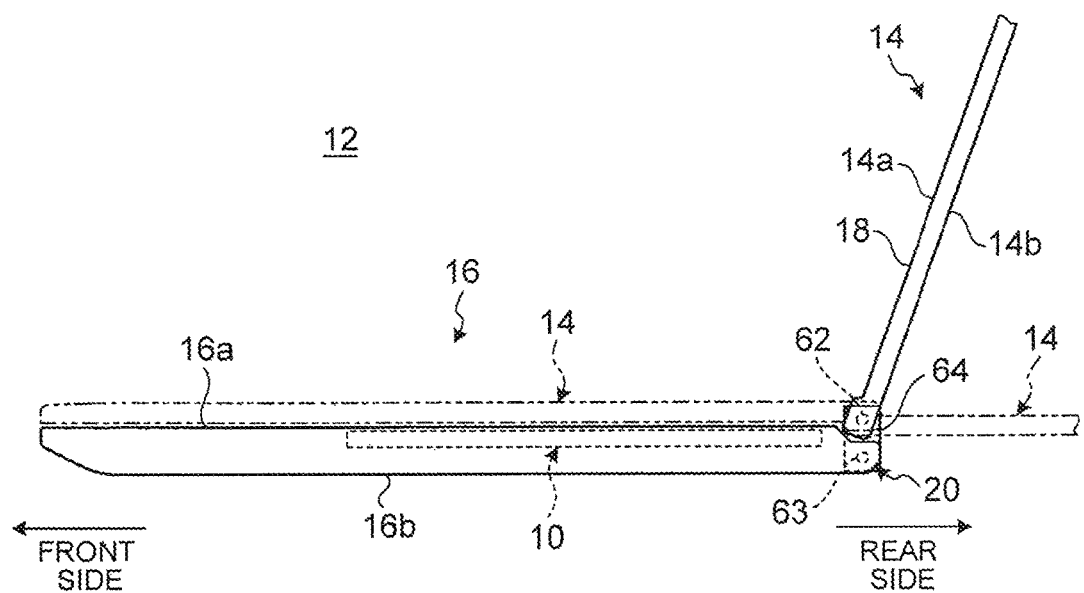
FIG. 2 is a side view of the portable computer from FIG. 1 being used as a laptop PC.

Referring now to the drawings and in particular to FIG. 1, there is depicted a plan view of portable information equipment 12 having a keyboard device 10 according a to a preferred embodiment of the present invention, when the portable information equipment 12 used in the mode of usage as a laptop PC is seen from above. FIG. 2 is a side view when the portable information equipment 12 shown in FIG. 1 is used in the mode of usage as the laptop PC, and FIG. 3 is a side view when the portable information equipment 12 is used in the mode of usage as a tablet PC by turning a display chassis 14 in an opening direction to a 360 degree position from a state shown in FIG. 2.

Figure 3:
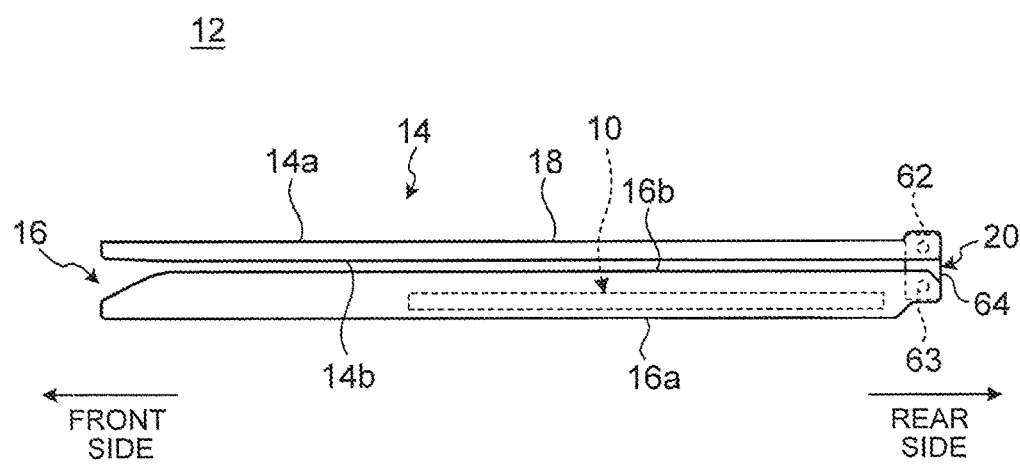
FIG. 3 is a side view of the portable computer from FIG. 1 being used as a tablet computer.

The portable information equipment 12 according to the embodiment can be used appropriately as the laptop PC in such a state that the display chassis 14 is turned to an angle position of about 90 to 150 degrees relative to a main body chassis 16 (see FIG. 1 and FIG. 2), and as the tablet PC in such a state that the display chassis 14 is turned to the 360 degree position relative to the main body chassis 16 (see FIG. 3). In other words, the portable information equipment 12 is a so-called convertible PC. The present invention can also be applied to various types of portable information equipment other than the convertible PC, such as a typical laptop PC with the display chassis opened only up to about 180 degrees, and a keyboard device mounted therein.

Hereinafter, based on the usage as the laptop PC shown in FIG. 1 and FIG. 2, description will be made on the assumption that the near side is called the front side (forward) and the far side is called the rear side (rearward) as viewed from a user who operates the keyboard device 10 provided on the top face (surface) 16a as an operation surface of the main body chassis 16 while visually confirming the display 18 provided on the inner face (surface) 14a of the display chassis 14, and the thickness direction of the main body chassis 16 is called the up-down direction and the width direction thereof is called the right-left direction.

Further, for convenience of description, it is assumed that the display chassis 14 is completely closed to the main body chassis 16 as an angle position of the display chassis 14 relative to the main body chassis 16, and a position where the inner face 14a and the top face 16a thereof face each other is called a 0 degree position (see the display chassis 14 indicated by the chain double-dashed line in FIG. 2). Then, it is assumed that the description is made by changing angles in a direction to turn the display chassis 14 in the opening direction using this 0 degree position as the base. For example, it is assumed that a position where the display chassis 14 and the main body chassis 16 are orthogonal to each other is called a 90 degree position, and a position where the inner face 14a and the top face 16a are parallel with each other while facing the same direction (upward) is called a 180 degree position (see the display chassis 14 indicated by the chain double-dashed line in FIG. 2). It is further assumed that a position where the back faces of the display chassis 14 and the main body chassis 16, i.e., the outer surface (back face) 14b of the display chassis 14 and the undersurface (back face) 16b of the main body chassis 16, face each other is called a 360 degree position (see FIG. 3). Since the 0 degree position, the 90 degree position, the 180 degree position, the 360 degree position, and the like may be angle positions having some minor deviations from the accurate numerical angle positions depending on the structure of the main body chassis 16, the display chassis 14, or hinges 20 as a matter of course, the angle positions including these deviated angle positions are called the 0 degree position and the like in the embodiment to make the description.

As shown in FIG. 1 to FIG. 3, the portable information equipment 12 includes the display chassis 14 having the display 18 and the main body chassis 16 having the keyboard device 10, where the display chassis 14 and the main body chassis 16 are coupled turnably by a pair of right and left hinges 20.

The display chassis 14 is electrically connected to the main body chassis 16 by cables, not shown, passing through the hinges 20. The display 18 is, for example, a touch panel type liquid crystal display device.

The main body chassis 16 is formed into the shape of a flat box, and the hinges 20 are provided in rear edge portions thereof. Various electronic components, not shown, such as a substrate, an arithmetic unit, and a memory, are housed within the main body chassis 16, and the keyboard device 10 is provided to be exposed on the top face 16a.

The keyboard device 10 is an isolation keyboard device having multiple key switches 21 arranged side by side in the front-rear and right-left directions, and a frame (cosmetic frame) 24 for filling a gap around a keycap 22 that forms the operation surface of each key switch 21. Thus, in the keyboard device 10, adjacent keycaps 22 are separated by the frame 24 to be independent of each other.

The frame 24 is a frame body in which multiple hole portions 24a (see FIG. 6 and FIG. 7) are formed in one plate-like member made of resin or the like so that the keycap 22 of each key switch 21 will be inserted into each of the hole portions 24a. The frame 24 is mounted to be substantially flush with or slightly lower than the top face 16a of the main body chassis 16.

In order to make the chassis thickness of the portable information equipment 12 as thin as possible at the 0 degree position and the 360 degree position, the keyboard device 10 according to the embodiment is equipped with a key depressing mechanism 26 for pushing the keycaps 22 down to a depressed position lower than the use position during normal operation and keeping the keycaps 22 in this depressed position.

Next, a specific structure of the keyboard device 10 will be described.

Figure 4:
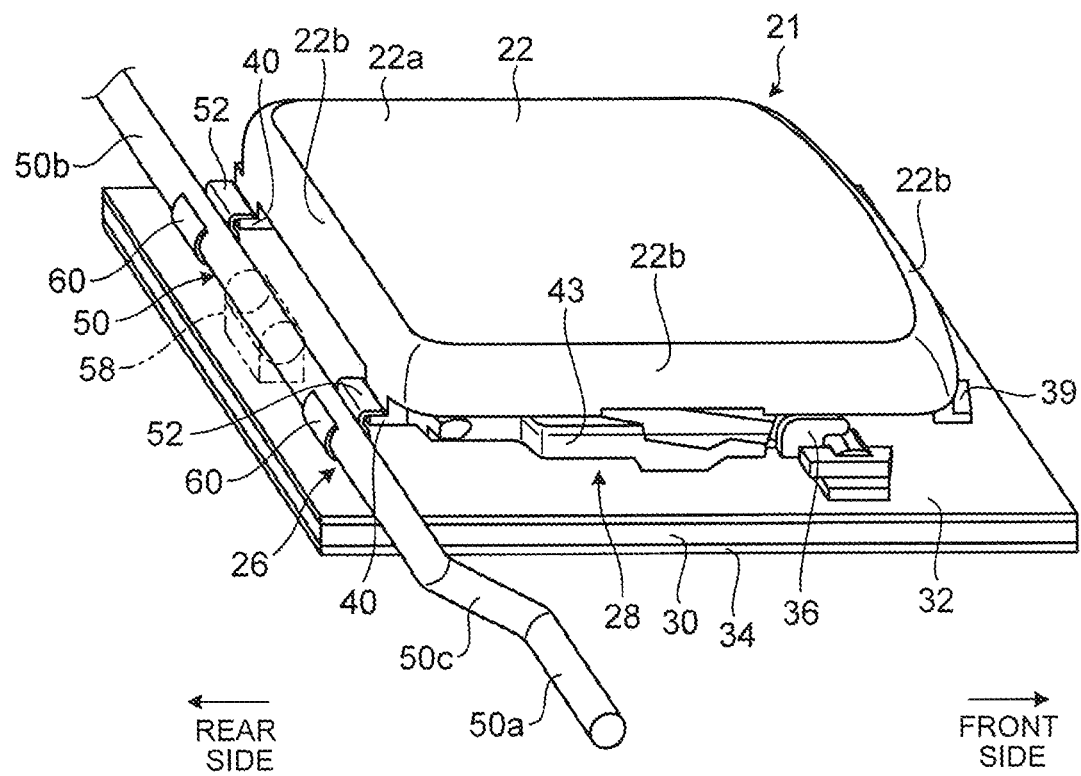
FIG. 4 is an enlarged perspective view of a key switch and the vicinity provided in the keyboard device shown in FIG. 1.

FIG. 4 is an enlarged perspective view of a key switch 21 and the vicinity provided in the keyboard device 10 shown in FIG. 1. FIG. 5 is an operation diagram of the key switch 21 shown in FIG. 4 by means of the key depressing mechanism 26, where FIG. 5A is a side view in a use position where the keycap 22 is located at the uppermost position, FIG. 5B is a side view showing a state where the keycap 22 is pushed down from the state shown in FIG. 5A, and FIG. 5C is a side view showing a state where the keycap 22 is further pushed down from the state shown in FIG. 5B and located in the depressed position as the lowermost position.

Figure 5A:
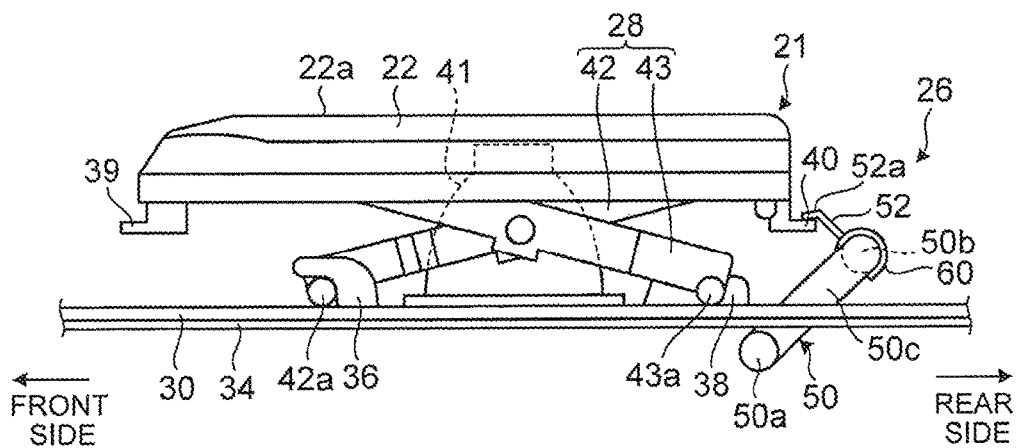
FIG. 5A is a side view in a use position where a keycap is located at the uppermost position.
Figure 5B:
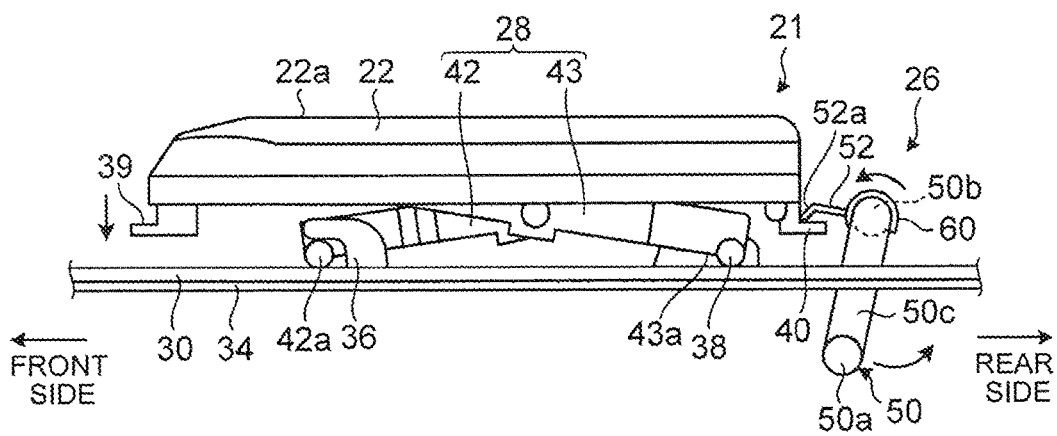
FIG. 5B is a side view showing a state where the keycap is pushed down from the state shown in FIG. 5A.
Figure 5C:
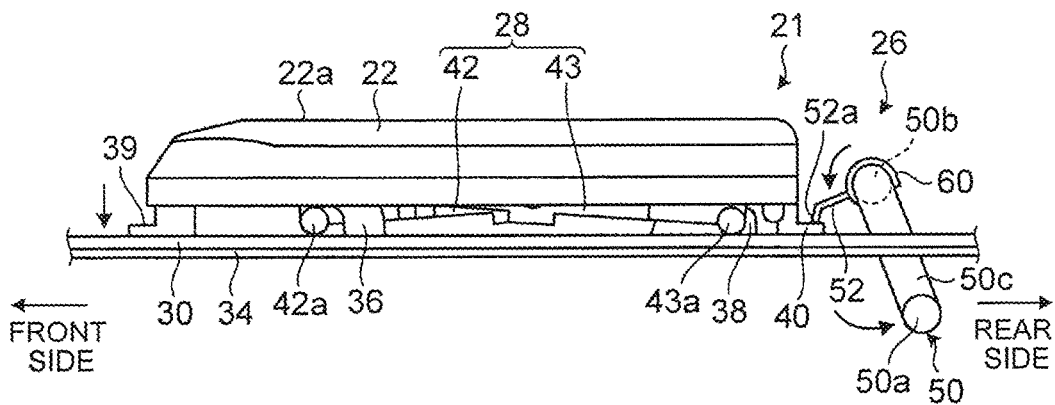
FIG. 5C is a side view showing a state where the keycap is further pushed down from the state shown in FIG. 5B and located in a depressed position as the lowermost position.

As shown in FIG. 4 and FIG. 5, the keyboard device 10 includes each key switch 21 with the keycap 22 supported by a guide mechanism 28 to be movable up and down, a base plate 30 for supporting the key switch 21 on the top face side, a membrane sheet 32 laminated on the top face side of the base plate 30, and a waterproof sheet 34 stuck on the undersurface side of the base plate 30. Note that the membrane sheet 32 is not shown in FIG. 5A to FIG. 5C.

The base plate 30 is formed by cutting and raising or punching out a thin aluminum plate or the like into a metal plate. The base plate 30 is a mounting plate of the key switches 21, and all the key switches 21 arranged in the keyboard device 10 share one base plate 30. Pairs of right and left hook-shaped locking pieces 36, 38 are formed on the front and rear sides of the top face of the base plate 30 to mount the guide mechanism 28 thereon. The frame 24 is placed on the top face of the base plate 30.

The membrane sheet 32 is a three-layered switch sheet to close a contact when being pressed, for example. The membrane sheet 32 is laminated on the base plate 30. The membrane sheet 32 closes the contact in such a manner that, when a position where a fixed contact and a moving contact overlap is pressed, the fixed contact and the moving contact stick fast to each other. The membrane sheet 32 has through holes everywhere, and the guide mechanism 28 lands on the top face of the base plate 30 through the through holes. The membrane sheet 32 may also be laminated under the base plate 30.

The keycap 22 is an operation member for inputting a signal, and is arranged above the base plate 30 through the guide mechanism 28. The keycap 22 is formed into a substantially square shape in plan view, has a top face 22a as an operation surface and side faces 22b extending downward from the four edges of the top face 22a, and is molded out of resin or the like, a pair of right and left projecting pieces 39, 39 are formed on the side of the front side face 22b to project frontward, and a pair of right and left receiving pieces (receiving parts) 40, 40 are formed on the side of the rear side face 22b to project rearward. An inner space of the keycap 22 surrounded by the top face 22a and the side faces 22b is a space for arranging the guide mechanism 28 and a rubber dome 41 (see FIG. 5A). Note that the rubber dome 41 is not shown in FIG. 5B and FIG. 5C.

Each projecting piece 39 is a wing-like member having a substantially rectangular shape in plan view to project outward from the side face 22b, functioning as a stopper which comes into contact with the top face of the frame 24 to prevent the keycap 22 from coming off upward. Each projecting piece 39 also has a function to define the highest height position of the keycap 22 in the upward moving direction.

Each receiving piece 40 is a wring-like member having a substantially rectangular shape in plan view to project outward from the side face 22h, which is a receiving part for receiving a force of the key depressing mechanism 26 to push the keycap 22 downward. Each receiving piece 40 functions not only as a stopper together with each projecting piece 39 to prevent the keycap 22 from coming off upward but also to define the highest height position of the keycap 22 in the upward moving direction.

The rubber dome 41 is an elastic member not only to press the membrane sheet 32 when the keycap 22 is depressed, but also to bring the keycap 22 back to the original position when the depressing operation of the keycap 22 is released. The rubber dome 41 is arranged between the membrane sheet 32 and the keycap 22. In other words, the keycap 22 is elastically supported by the rubber dome 41 in a state of being guided by the guide mechanism 28 to be movable up and down. The rubber dome 41 is made of an elastic material having flexibility such as silicon rubber.

When the keycap 22 is depressed, the rubber dome 41 is elastically deformed by the depressing force in the key switch 21 and the membrane sheet 32 is pressed, so that the membrane sheet 32 will close the contact. On the other hand, when the depressing, operation to the keycap 22 is released, the keycap 22 returns to the original position (use position) by the elastic restoring force of the rubber dome 41 so that the membrane sheet 32 will open the contact.

As shown in FIG. 5A to FIG. 5C, the guide mechanism 28 is to support the keycap 22 to be movable up and down, which is installed foldably between the base plate 30 and the keycap 22. In the embodiment, a pantograph structure having an inside frame 42 and an outside frame 43 installed in the form of a brace is used as the guide mechanism 28.

For example, the inside frame 42 is so structured that a pair of right and left shaft members 42a, 42a formed on the front side are locked by the locking pieces 36 on the front side of the base plate 30 movably in the front-rear direction and rotatably relative to the locking pieces 36, and a pair of right and left shaft members, not shown, formed on the rear side are supported immovably and rotatably relative to locking parts, not shown, formed on the inner face on the rear side of the keycap 22. Further, the outside frame 43 is so structured that a pair of right and left shaft members 43a, 43a formed on the rear side are supported immovably and rotatably relative to the locking pieces 38 on the rear side of the base plate 30, and a pair of right and left shaft members, not shown, formed on the front side are supported immovably and rotatably relative to locking parts, not shown, formed on the inner face on the front side of the keycap 22.

Next, the key depressing mechanism 26 for keeping such a keycap 22 of each key switch 21 in the depressed position will be described.

Figure 6:
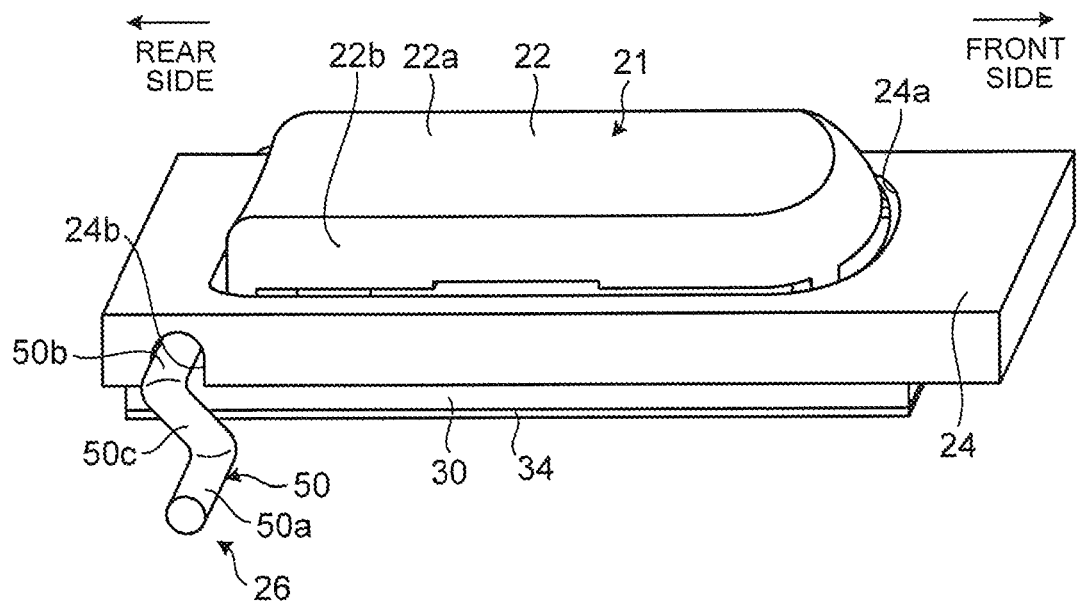
FIG. 6 is an enlarged perspective view of the major part that shows a state of the keycap in the use position.
Figure 7:
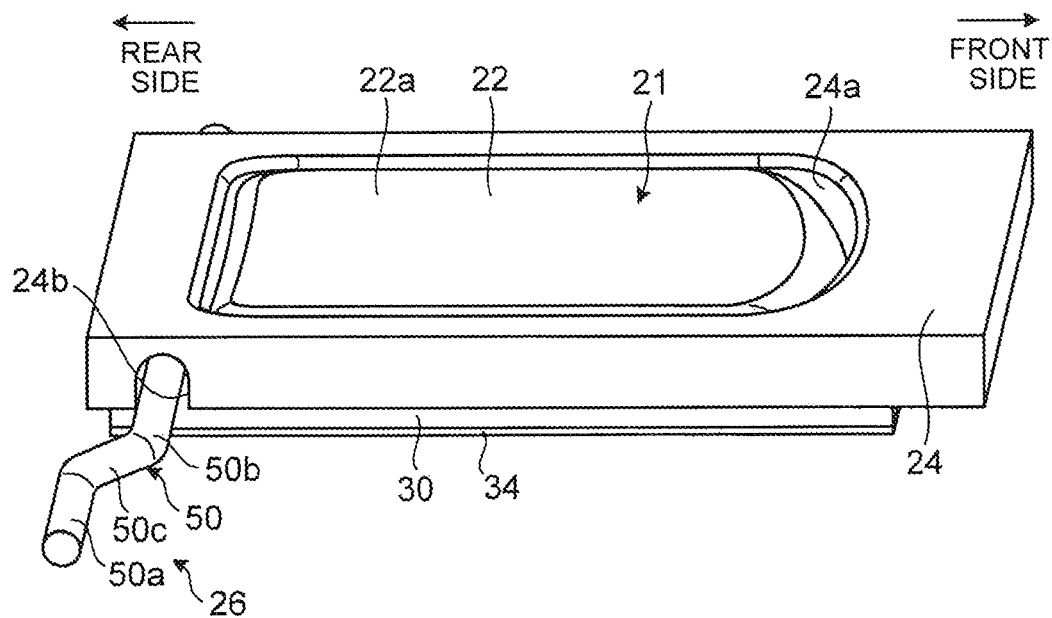
FIG. 7 is an enlarged perspective view of the major part that shows a state of the keycap kept in the depressed position by the key depressing mechanism.

FIG. 6 is an enlarged perspective view of the major part that shows a state of the keycap 22 in the use position, and FIG. 7 is an enlarged perspective view of the major part that shows a state of the keycap 22 kept in the depressed position by the key depressing mechanism 26. In other words, the keycap 22 in FIG. 6 can be depressed by a user, and the keycap 22 in FIG. 7 cannot be depressed by the user. Further, FIG. 8 is a plan view schematically showing the structure of the key depressing mechanism 26.

As shown in FIG. 4 and FIG. 5, the key depressing mechanism 26 includes a rotating shaft member 50 provided along the rear side of each of the keycaps 22, and a pressing piece (depressing piece) 52 arranged to project frontward as the side of each keycap 22 from the outer circumferential surface of the rotating shaft member 50 and come into contact with the top face of the receiving piece 40 of each keycap 22 so that the receiving piece 40 can be depressed downward.

Figure 8:
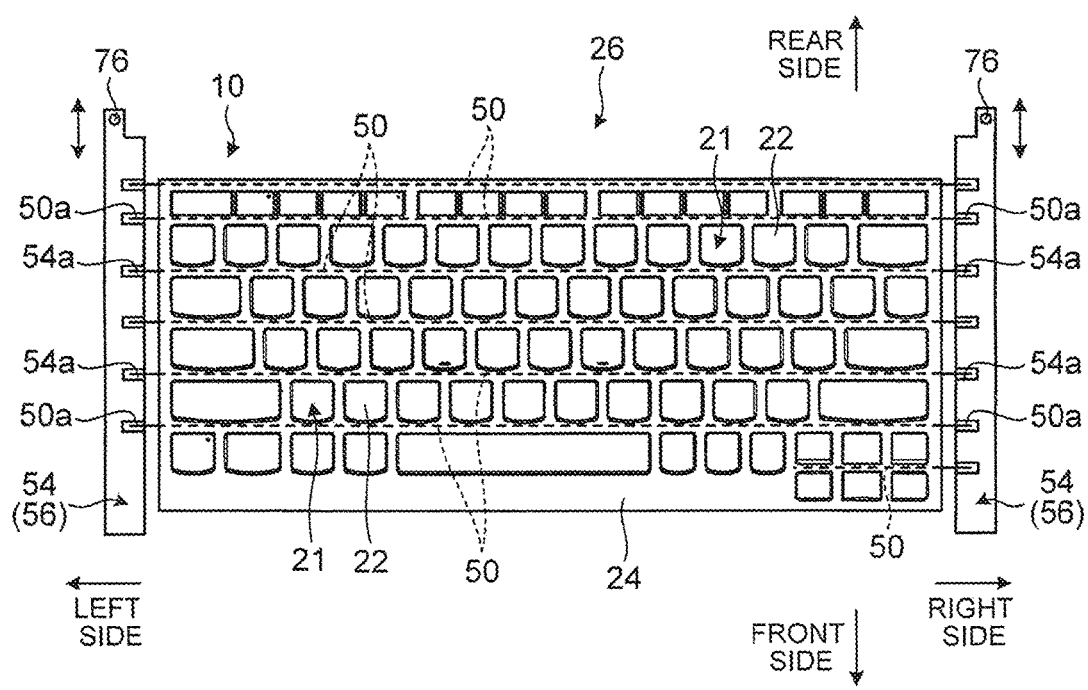
FIG. 8 is a plan view showing the structure of the key depressing mechanism.

As shown in FIG. 8, since the rotating shaft member 50 is provided along the rear side of each of the keycaps 22 arranged side by side in the right-left direction of the keyboard device 10, multiple rotating shaft members 50 are arranged side by side in the front-rear direction of the keyboard device 10. In the case of the embodiment, since seven rows of keycaps 22 are arranged in the front-rear direction, the number of rotating shaft members 50 arranged is also seven. In the case of the embodiment, since a rotating shaft member 50 in the front row has only to correspond to three right-hand keycaps 22 in the front row, the rotating shaft member 50 is shorter than the other rotating shaft members 50. Each rotating shaft member 50 is a hard wire rod (wire) made, for example, of SUS material or the like and having sufficient rigidity even when the diameter thereof is about 1 mm.

Each rotating shaft member 50 extends across the right-left direction of the keyboard device 10 on the undersurface side of the frame 24 of the keyboard device 10. Each rotating shaft member 50 is so structured that drive ends 50*a*, 50*a* projecting from both right-left sides of the flame 24 are engaged rotatably in slits 54*a*, 54*a* of slide members 54, 54 respectively provided at the right and left sides of the keyboard device 10. Thus, the rotating shaft member 50 is spanned between the slits 54*a*, 54*a* of the slide members 54, 54 provided at the right and left sides of the keyboard device 10. Since the rotating shaft member 50 in the front row has the short-span structure to correspond only to the three right-hand keycaps 22 in the front row, the rotating shaft member 50 is engaged only in the slit 54*a* of the right-hand slide member 54. The slide members 54 form a link mechanism 56 to be described later, and are slidable in the front-rear direction on the right and left sides of the keyboard device 10.

As shown in FIG. 4 and FIG. 5, the rotating shaft member 50 has a linear base part 50*b* extending in the right-left direction along the rear side of the keycap 22, and the drive ends 50*a* provided at both ends of the base part 50*b*. Each drive end 50*a* is formed by bending an arm part 50*c* at 90 degrees from the tip of the arm part 50*c* formed by bending the end portion of the base part 50*b* at 90 degrees to project in the right-left direction in parallel with the base part 50*b*. Thus, both ends of the rotating shaft member 50 are formed into a crank shape. As shown in FIG. 6 and FIG. 7, notch portions 24*b* are provided on the right and left side faces of the frame 24 in a position corresponding to each rotating shaft member 50, and the arm part 50*c* and the drive end 50*a* are provided in an end portion of the base part 50*b* passing through the notch portions 24*b*.

The base part 50*b* is positioned and supported rotatably by a shaft bearing part 58 (see FIG. 4) provided on the base plate 30 or the frame 24 at a proper position in the right-left direction thereof. Thus, when the right and left slide members 54 move in the front-rear direction, the drive ends 50*a* move in the front-rear direction together with the slide members 54 while rotating within the slits 54*a* of the slide members 54. As a result, the base part 50*b* rotates about the axis while the arm part 50*c* swings like a pendulum in the front-rear direction with the base part 50*b* pivotally supported by the shaft bearing part 58 as the center of rotation (see FIG. 5 to FIG. 7).

As shown in FIGS. 4 and 5, the pressing piece 52 is formed to be bent from a mounting cylindrical body 60 fitted and fixed onto the outer circumferential surface of the base part 50*b* of each rotating shaft member 50 to project from the outer circumferential surface of the base part 50*b* to the side of the keycap 22. The mounting cylindrical body 60 is fixed to the base part 50*b* by caulking fixation or spot welding. The pressing piece 52 is a plate piece projecting from the outer circumferential surface of the mounting cylindrical body 60, and a pressing portion 52*a* is provided at the front edge of the pressing piece 52 to be bent downward in some degree (see FIG. 5A to FIG. 5C).

In the case of the embodiment, as shown in FIG. 4, pairs of right and left mounting cylindrical bodies 60 and pressing pieces 52 are provided for one keycap 22 so that a pair of right and left receiving pieces 40 of the keycap 22 can be pressed. The mounting cylindrical bodies 60 may be formed from one long rod extending across the longitudinal direction of the base part 50*b*, and the pressing pieces 52 may also be formed from one long plate extending across the longitudinal direction of this mounting cylindrical body 60. In this case, the pressing piece 52 can be caused to correspond to each of the keycaps 22 arranged side by side in the right-left direction at a time merely by fixing the mounting cylindrical body 60 to the rotating shaft member 50, thereby reducing the number of parts and improving manufacturing efficiency.

In such a key depressing mechanism 26, when the right and left slide members 54 move rearward and the drive ends 50*a* move rearward along therewith in a state where the keycap 22 is located in the use position shown in FIG. 5A and FIG. 6, the base part 50*b* rotates about the axis. As a result, each of the pressing portions 52*a* of the pressing pieces 52 projecting from the outer circumferential surface of the base part 50*b* swings downward to push down the receiving piece 40 of the keycap 22 so that the keycap 22 can be forcibly pushed down to a depressed position and further kept in this depressed position (see FIG. 5C and FIG. 7). Note that the top face 22*a* of the keycap 22 is flush with or slightly lower than the top face of the frame 24 in the depressed position (see FIG. 7). Therefore, the top face of the keyboard device 10 is formed into a planar shape without irregularities.

On the other hand, when the right and left slide members 54 move forward reversely to that in the depressing operation in the state where the keycap 22 is in the depressed position shown in FIG. 5C and FIG. 7, the base part 50*b* also rotates in the direction reverse to that in the depressing operation. As a result, the pressing portions 52*a* of the pressing pieces 52 swing upward to release the pressing action on the receiving pieces 40 so that the keycap 22 will be moved up by a biasing force of the rubber dome 41 to return to the use position (see FIG. 5A and FIG. 6).

The depressing operation of the keycap 22 by such a key depressing, mechanism 26 may be carried out by sliding the slide members 54 by hand using operating switches in the front-rear direction, not shown, provided, for example, on the outer surface of the main body chassis 16, or by sliding the slide members 54 electrically using, a motor or the like, not shown, based on the operation of predetermined operating switches. However, in the portable information equipment 12 according to the embodiment, the hinges 20 and the key depressing mechanism 26 are linked through the link mechanism 56 to operate the key depressing mechanism 26 according to the turning angle position of the display chassis 14 in consideration of the necessity of use of the keyboard device 10 by the user depending on the opening/closing position of the display chassis 14.

The hinges 20 and the link mechanism 56 to interlock the turning operation of the display chassis 14 and the key depressing mechanism 26 will next be described.

First, an example of the structure of the hinges 20 will be described.

Figure 9:
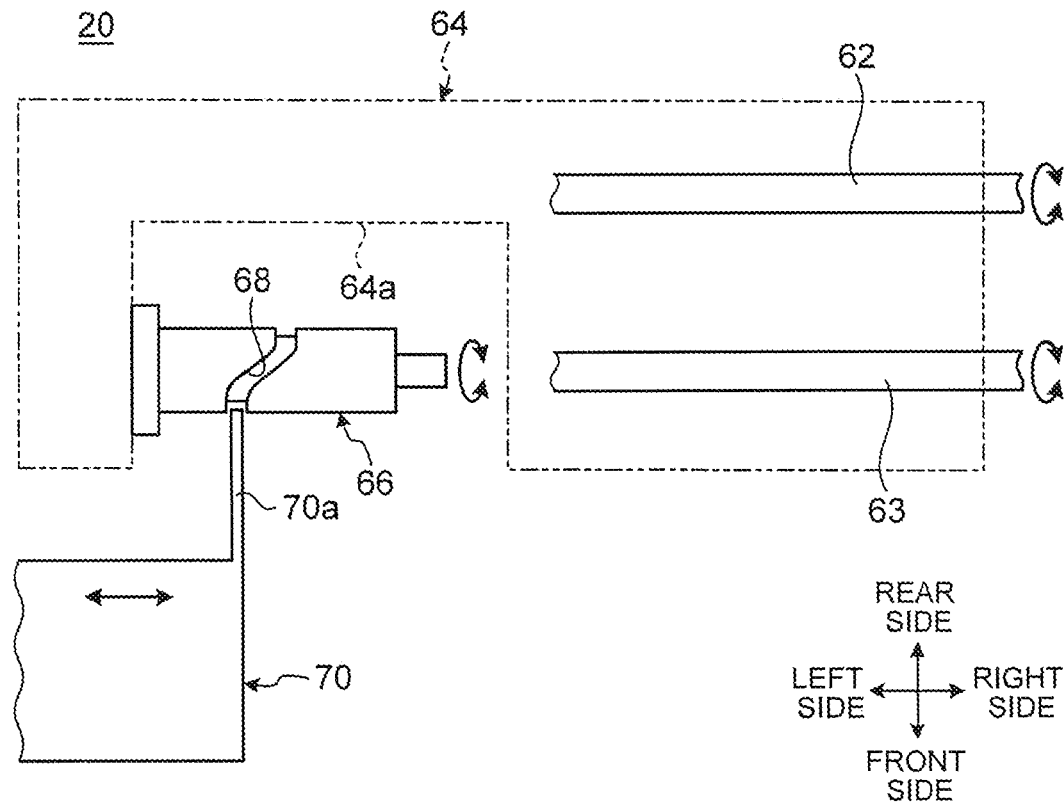
FIG. 9 is a plan view showing an example of the structure of a hinge used in the portable computer.

FIG. 9 is a plan view schematically showing an example of the structure of the hinges 20 used in the portable information equipment 12 according to the embodiment, where the left hinge 20 is representatively shown. Although the left hinge 20 will be illustrated as the hinge 20 below, since the right hinge 20 is bilaterally symmetric to the left hinge 20 and substantially of the same structure, the detailed description thereof will be omitted.

As shown in FIG. 9, the hinge 20 includes a first shaft 62 extending in the right-left direction, a second shaft 63 placed in parallel with the first shaft 62, and a box-like hinge chassis 64 for rotatably supporting and housing the first shaft 62 and the second shaft 63 (also see FIG. 2 and FIG. 3).

One end of the first shaft 62 is inserted and fixed into a fitting hole, not shown, provided in the display chassis 14 so that the first shaft 62 will rotate integrally with the display chassis 14. One end of the second shaft 63 is inserted and fixed into a fitting hole, not shown, provided in the main body chassis 16 so that the second shaft 63 will rotate integrally with the main body chassis 16. Most of the first shaft 62 and the second shaft 63 are rotatably housed inside the hinge chassis 64. For example, these first shaft 62 and second shaft 63 are such that only the first shaft 62 rotates from the 0 degree position to the 180 degree position, and only the second shaft 63 rotates from the 180 degree position to the 360 degree position. Of course, the rotation of the first shaft 62 and the second shaft 63 at any other rotation angle position may be selected, or the first shaft 62 and the second shaft 63 may rotate in synchronization with each other by means of a train of gears, not shown.

In the hinge chassis 64, a recessed portion 64a is provided to allow a projecting portion provided in a rear edge portion of the main body chassis 16 to gain entrance thereto, and a spiral pin 66 is provided on one side face of this recessed portion 64a to project therefrom. The spiral pin 66 is provided concentrically with the second shaft 63 on the side of the main body chassis 16 to rotate concentrically with the second shaft 63 in conjunction with the turning operation of the hinge chassis 64. A rail groove 68 having a shape shown in a development view of FIG. 10 is spirally formed on the outer circumferential surface of the spiral pin 66.

The rail groove 68 has a first actuating portion 68a and a second actuating portion 68b formed spirally on the outer circumferential surface of the spiral pin 66 along the axial direction, and an idling portion 68c provided between the first actuating portion 68a and the second actuating portion 68b and formed on the outer circumferential surface of the spiral pin 66 along the circumferential direction. The first actuating portion 68a is a groove headed from the right side to the left side of the spiral pin 66, and the second actuating portion 68b is a groove headed from the left side to the right side of the spiral pin 66. As shown in FIG. 10, the positions of the first actuating portion 68a and the second actuating portion 68b at the 0 degree position and the 360 degree position in the right-left direction coincide with each other, and the positions of the first actuating portion 68a and the second actuating portion 68b at the 60 degree position and the 180 degree position in the right-left direction coincide with each other. The idling portion 68e is a groove along the circumferential direction of the spiral pin 66 without deviation in the right-left direction.

An engaging piece 70a of a hinge link 70 that forms the link mechanism 56 is slidably engaged in the rail groove 68. The engaging piece 70a moves along the first actuating portion 68a during turning of the display chassis 14 from the 0 degree position to the 60 degree position, moves along the idling portion 68c during turning from the 60 degree position to the 180 degree position, and moves along the second actuating portion 68b during turning from the 180 degree position to the 360 degree position.

Figure 10:
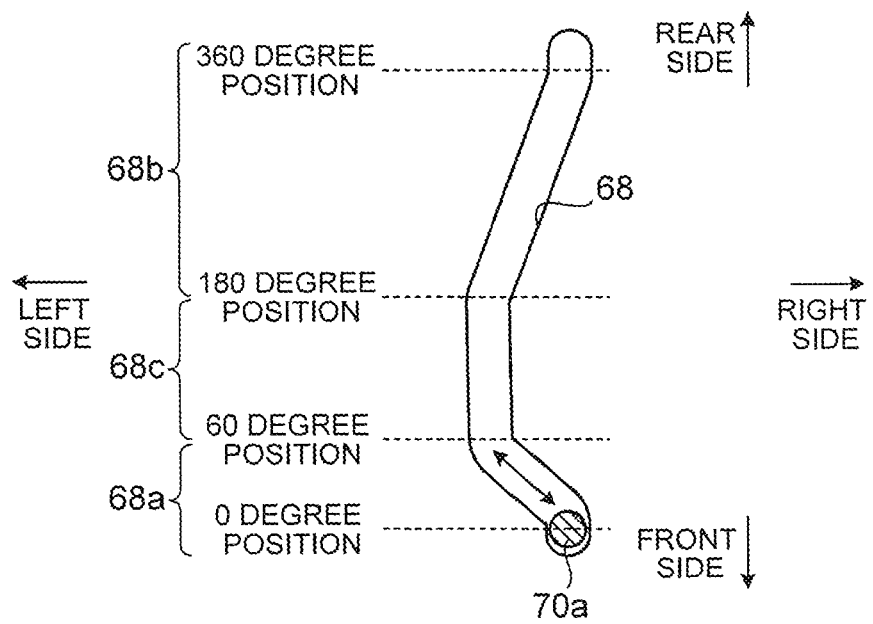
FIG. 10 is a diagram of a rail groove formed on the outer circumferential surface of a spiral pin provided in the hinge.

For example, when the present invention is applied to such a typical laptop PC that the display chassis 14 can be opened/closed at least up to the 90 degree position, e.g., up to about the 180 degree position, a single-axis hinge mechanism may be used instead of the biaxial hinges 20 as mentioned above, in this case, for example, the rail groove 68 is formed in a range from the 0 degree position to the 90 degree position or the 180 degree position in FIG. 10.

Next, the link mechanism 56 for interlocking the turning operation of the display chassis 14 by the hinge 20 and the depressing operation of each keycap 22 by the key depressing mechanism 26 will be described.

Figure 11:
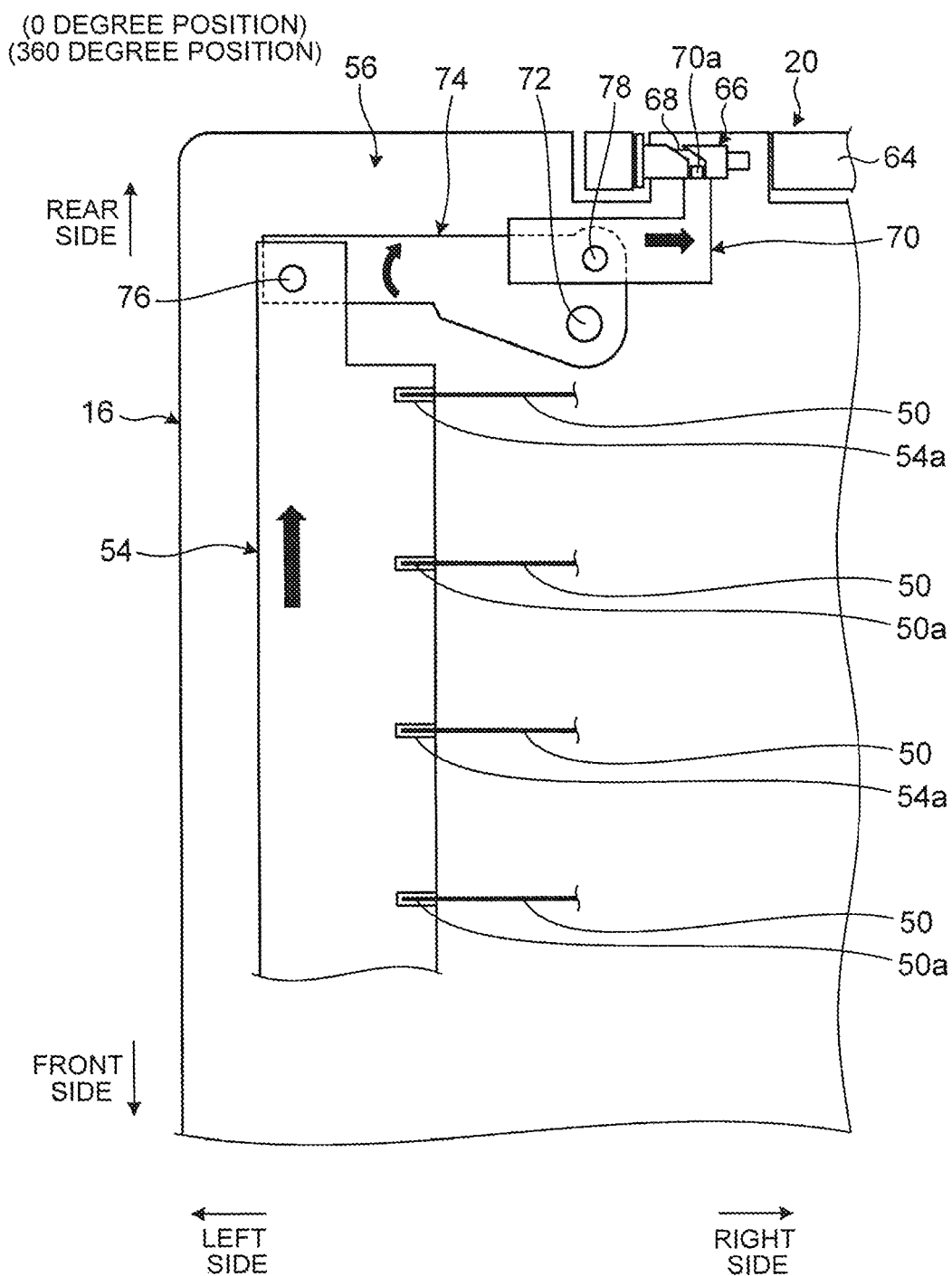
FIG. 11 is a plan view showing a state of a link mechanism at a 0 degree position and a 360 degree position.
Figure 12:
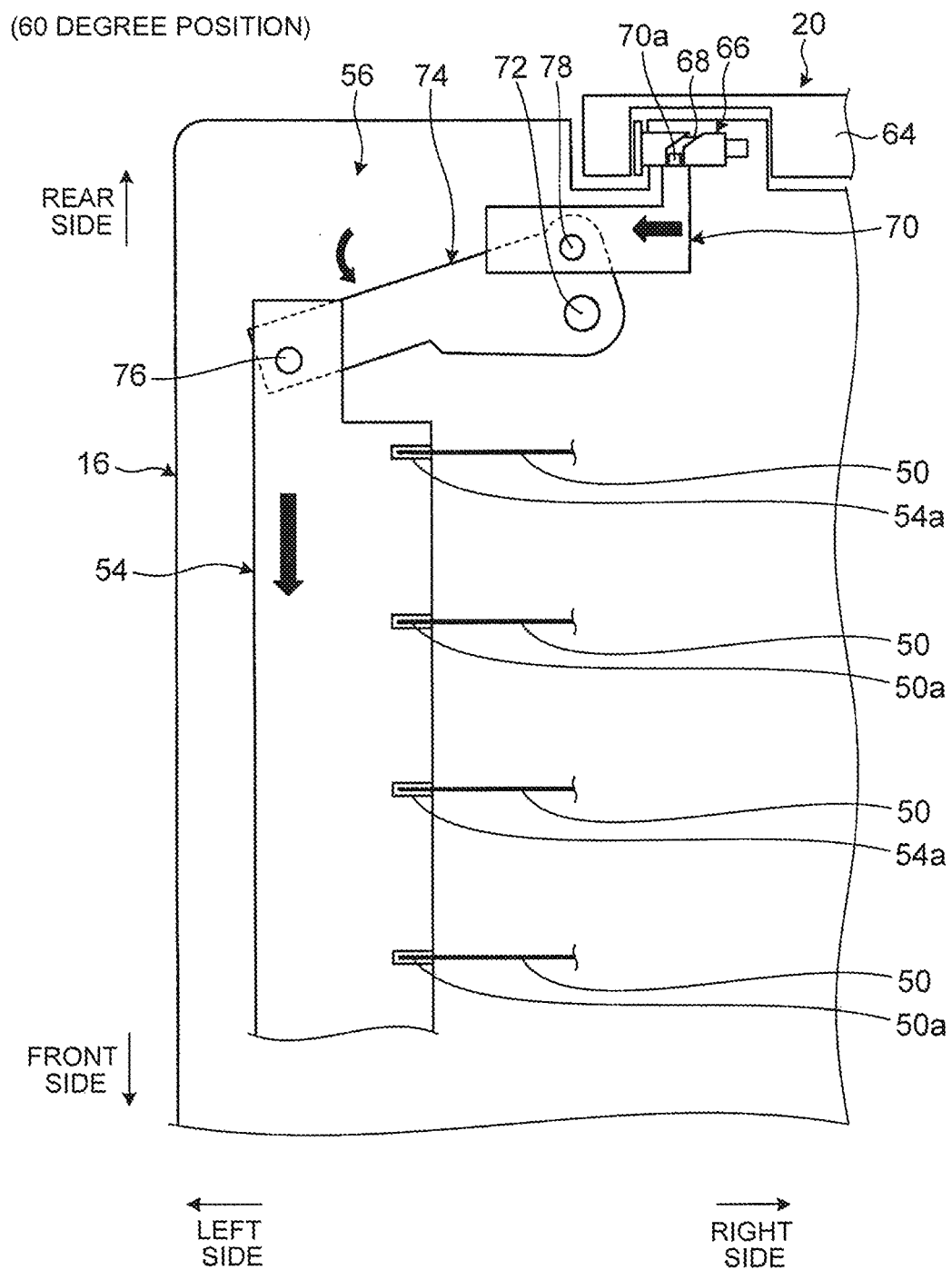
FIG. 12 is a plan view showing a state of the link mechanism at a 60 degree position.

FIG. 11 is a plan view schematically showing a state of the link mechanism 56 at the 0 degree position and the 360 degree position, and FIG. 12 is a plan view schematically showing a state of the link mechanism 56 at the 60 degree position. In FIG. 11 and FIG. 12, although the left-hand hinge 20 and the link mechanism 56 interlocking therewith are illustrated, since the right-hand hinge 20 and the link mechanism 56 interlocking therewith is bilaterally symmetrical to the left-hand ones, which is of substantially the same structure, the detailed description thereof will be omitted.

As shown in FIG. 11 and FIG. 12, the link mechanism 56 operates inside the main body chassis 16, and includes the hinge link 70 supported by the inner face of the main body chassis 16 to be movable in the right-left direction, a swing member 74 supported about a turning axis 72 at one end to be turnable with respect to the inner face of the main body chassis 16, and the slide member 54 rotatably coupled to the other end opposite to the turning axis 72 of the swing member 74 through an operating pin 76.

The hinge link 70 is an L-plate having the engaging piece 70a projecting rearward to be engaged in the rail groove 68 of the spiral pin 66. In the case where the display chassis 14 is turned to rotate the spiral pin 66, when the engaging piece 70a is located in the first actuating portion 68a and the second actuating portion 68b of the rail groove 68, the hinge link 70 slidingly moves in the right-left direction, while when the engaging niece 70a is located in the idling portion 68c, the hinge link 70 does not move (see FIG. 10).

The swing member 74 is a substantially triangular plate having a curved shape expanded to one end side as the side of the hinge link 70 where the turning axis 72 is provided. The swing member 74 is coupled to the hinge link 70 in a position as the rear side of the turning axis 72 in such a state that the swing member 74 and the hinge link 70 can be rotated with respect to each other by the coupling pin 78. The other end of the swing member 74 on the side opposite to the turning axis 72 is rotatably coupled to the slide member 54 through the operating pin 76.

The slide member 54 is a long rectangular plate provided in the main body chassis 16 slidably in the front-rear direction through a guide structure, not shown. The operating pin 76 is provided at the rear end of the slide member 54 to project therefrom, and this operating pin 76 is rotatably coupled to the swing member 74.

Thus, in such a link mechanism 56, when the hinge link 70 slidingly moves in the right-left direction in response to the rotation of the spiral pin 66, the coupling pin 78 becomes the point of effort and the turning axis 72 becomes the turning fulcrum to cause the swing member 74 to turn so that the operating pin 76 will become the point of application to move the slide member 54 in the front-rear direction (see FIG. 11 and FIG. 12).

Next, a relationship between the turning operation of the display chassis 14 interlocked by the link mechanism 56 and the operation of the key depressing mechanism 26 will be described.

First, when the display chassis 14 is at the 0 degree position, the swing member 74 is located in a position most turned clockwise in FIG. 11 by means of the hinge link 70 at the initial position as shown in FIG. 11, and the operating pin 76 is located at the rearmost position. Therefore, the slide member 54 is also in a position moved to the rearmost side. At this time, the engaging piece 70a of the hinge link 70 is located in a position as the start point of the first actuating portion 68a of the rail groove 68 formed on the spiral pin 66 of the hinge 20 (see FIG. 10).

In this state, as shown in FIG. 5C and FIG. 7, the drive end 50a of the rotating shaft member 50 is in a position moved to the rearmost side by means of the slide member 54 to keep each keycap 22 in the depressed position where the receiving piece 40 is pushed down by the pressing piece 52. Therefore, the top face 22a of the keycap 22 is located flush with or slightly lower than the top face of the frame 24, and hence the top face of the keyboard device 10 lies on a plane. Thus, the display 18 of the display chassis 14 closed off to the main body chassis 16 does not interfere with the keycap 22, and hence the thickness of the portable information equipment 12 can be made as thin as possible.

Next, when the display chassis 14 is turned from the 0 degree position in the opening direction, the hinge chassis 64 of the hinge 20 is also turned to rotate the spiral pin 66. In a range from the 0 degree position to the 60 degree position, the engaging piece 70a of the hinge link 70 is located in the first actuating portion 68a of the rail groove 68 (see FIG. 10). Therefore, the hinge link 70 is pushed out and moved in the advancing direction (left side in FIG. 11) due to the rotation of the spiral pin 66 in the range from the 0 degree position to the 60 degree position to turn the swing member 74 counterclockwise in FIG. 11 to advance the slide member 54 forward through the operating pin 76.

When the slide member 54 moves frontward, since the drive end 50a of the rotating shaft member 50 also moves forward, the rotating shaft member 50 rotates in a direction to move the pressing portion 52a of the pressing piece 52 upward (see FIG. 5B). As a result, since the pressing action of the pressing piece 52 on the receiving piece 40 is released, the keycap 22 also moves together with the pressing piece 52 by the biasing force of the rubber dome 41.

Then, at the 60 degree position, since the engaging piece 70a is, located at a position as the end point of the first actuating portion 68a as shown in FIG. 10, the swing member 74 is located in a position most turned counterclockwise in FIG. 12 by means of the hinge link 70 at the most advanced position as shown in FIG. 12, and hence the operating pin 76 is located at the frontmost position. Therefore, the slide member 54 is also in a position moved to the frontmost side.

In this state, as shown in FIG. 5A and FIG. 6, the drive end 50a of the rotating shaft member 50 is in a position moved to the frontmost side by means of the slide member 54, the keycap 22 is in the use position as a position moved to the uppermost position, and the highest height position of the receiving piece 40 is defined by the pressing piece 52 moved to the uppermost position. Thus, in the portable information equipment 12, since the keycap 22 is located in the use position to project upward from the top face of the frame 24 when the display chassis 14 is opened up to the 60 degree position, the keyboard device 10 becomes usable.

Subsequently, since the engaging piece 70a of the hinge link 70 is located in the idling portion 68c of the rail groove 68 from the 90 degree position to the 180 degree position (see FIG. 10), the hinge link 70 does not move even when the hinge chassis 64 is turned to rotate the spiral pin 66. Since there is no change in the position of the slide member 54 as well, the keycap 22 is kept in the use position as shown in FIG. 5A and FIG. 6. In other words, in the portable information equipment 12, the keyboard device 10 remains usable in a range of the 60 to 180 degree positions where use as the laptop PC is expected.

Next, when the display chassis 14 is further turned from the 180 degree position in the opening direction, the engaging piece 70a of the hinge link 70 moves along the second actuating portion 68b of the rail groove 68 on the spiral pin 66 (see FIG. 10). Therefore, the hinge link 70 is pulled and moved in a retracting direction (right side in FIG. 12), opposite to the direction from the 0 degree position to the 60 degree position, by the rotation of the spiral pin 66 from the 180 degree position to the 360 degree position to turn the swing member 74 clockwise in FIG. 12 so as to back the slide member 54 rearward through the operating pin 76.

When the slide member 54 moves rearward from the state at the 180 degree position (the same position as the 60 degree position shown in FIG. 12), since the drive end 50a of the rotating shaft member 50 also move rearward, the rotating shaft member 50 rotates in a direction to move the pressing piece 52 downward (see FIG. 5B). As a result, the receiving piece 40 receives the pressing action of the pressing portion 52a of the pressing piece 52 so that the keycap 22 will move downward against the biasing force of the rubber dome 41 together with the pressing piece 52.

Then, at the 360 degree position, since the engaging piece 70a is located at a position as the end point of the second actuating portion 68b as shown in FIG. 10, the swing member 74 is located in a position turned most clockwise by the hinge link 70 located in the most retracted position as shown in FIG. 11, and the operating pin 76 is located in the rearmost position. Therefore, the slide member 54 is also located in a position moved to the rearmost side.

In this state, as shown in FIGS. 5C and 7, the drive end 50a of the rotating shaft member 50 is located in a position moved to the rearmost side by the slide member 54 like in the case of the 0 degree position, and the keycap 22 is kept in the depressed position where the receiving piece 40 is depressed by the pressing piece 52. Therefore, the top face 22a of the keycap 22 is located flush with or slightly lower than the top face of the frame 24, and hence the top face of the keyboard device 10 lies on a plane. Thus, since the display chassis 14 is turned over relative to the main body chassis 16 so that the top face 16a of the main body chassis 16 that becomes the back face of the tablet PC will be formed in the shape of a flat plate without any uneven pattern by the keycaps 22, the keyboard device 10 does not interfere with use as the tablet PC.

On the other hand, when the display chassis 14 located at the 360 degree position is turned in the closing direction, an operation opposite to the turning operation in the opening direction mentioned above is carried out. In other words, the slide member 54 moves forward as the display chassis 14 is turned from the 360 degree position to the 180 degree position to rotate the rotating shaft member 50 in a direction to release the pressing action of the pressing piece 52 on the receiving piece 40. This causes the keycap 22 to return to the use position as the position moved to the uppermost side. The use position of the keycap 22 is maintained from the 180 degree position to the 60 degree position. Then, as the display chassis 14 is turned from the 60 degree position to the 0 degree position, the slide member 54 moves rearward this time to rotate the rotating shaft member 50 in a direction in which the pressing piece 52 pushes the receiving piece 40 down. Since this locates the keycap 22 to be flush with or slightly lower than the top face of the frame 24, the display chassis 14 can be closed without interference between the display 18 and the keycap 22.

In the above configuration example, when the slide member 54 slides in the front-rear direction, all the rotating shaft members 50 rotate at the same time, and all the keycaps 22 move up and down at the same time. Thus, since a load necessary to push all the keycaps 22 down against the biasing force of the rubber dome 41 is applied to each member of the hinge 20 and the link mechanism 56 for moving the keycap 22 up and down, the load on each member also increases. Therefore, if such a structure that makes the rotation timing of each rotating shaft member 50 different is employed, the load on each member can be reduced to make each member smaller and thinner.

Figure 13A:
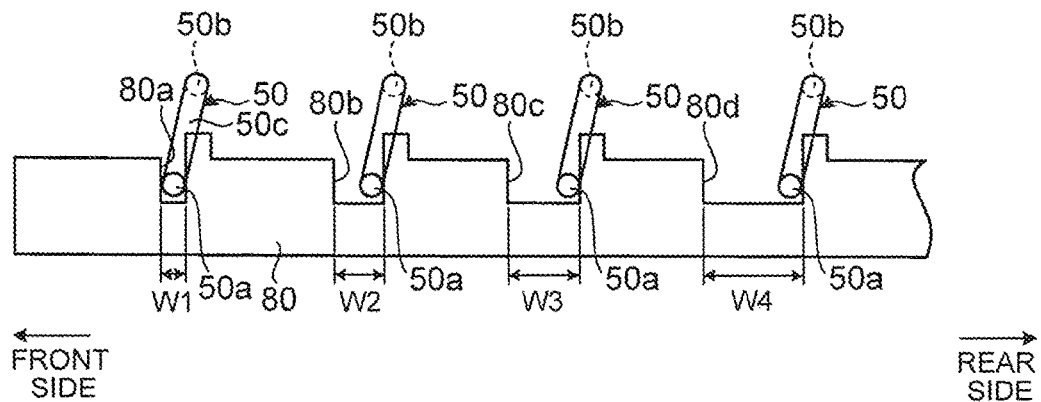
FIG. 13A is a diagram showing a state at a 60 degree position where the slide member moves to the frontmost side.
Figure 13B:
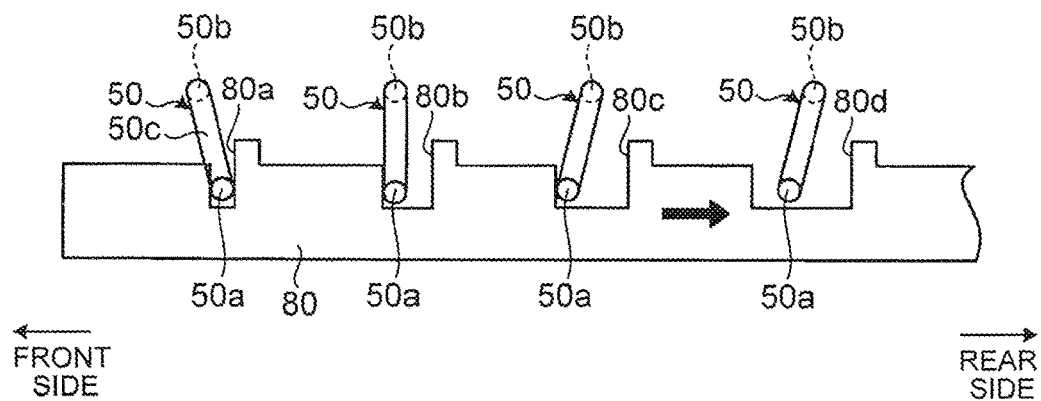
FIG. 13B is a diagram showing a state in which the slide member moves rearward from the state shown in FIG. 13A to make some rotating shaft members start rotating.
Figure 13C:
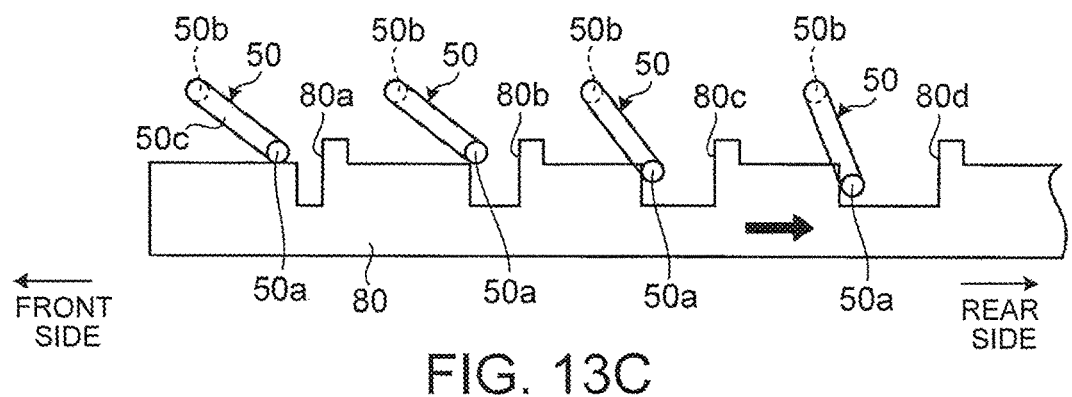
FIG. 13C is a diagram showing a state in which the slide member moves further rearward from the state shown in FIG. 13B to make some rotating shaft members finish rotating and some other rotating shaft members start rotating.

FIGS. 13A-13C are diagrams showing a configuration example of rotating the rotating shaft members 50 by a slide member 80 having a time difference structure for rotating each rotating shaft member 50 at different timing. FIG. 13A is a diagram showing a state in which the slide member 80 moves to the frontmost side at the 60 degree position. FIG. 13B is a diagram showing a state in which the slide member 80 moves rearward from the state shown in FIG. 13A to make some rotating shaft members 50 start rotating, and FIG. 13C is a diagram showing a state in which the slide member 80 moves further rearward from the state shown in FIG. 13B to make some rotating shaft members 50 finish rotating and some other rotating shaft members 50 start rotating.

In comparison with the slide member 54 mentioned above, the slide member 80 shown in FIG. 13A to FIG. 13C has slits 80a to 80d different in shape from the slit 54a. Like the slide member 54, the seven slits corresponding to the seven rotating shaft members 50 are formed in the slide member 80, but only the four slits 80a to 80d are shown in FIG. 13A to FIG. 13C, and the other slits are not shown.

Each of the slits 80a to 80d has a different width of the groove in the front-rear direction into which the drive end 50a of the rotating shaft member 50 is inserted. In other words, when the width W1 of the slit 80a located on the frontmost side is used as the base, the width W2 of the slit 80b next to the slit 80a on the rear side is set to be double the width W1, the width W3 of the slit 80c is set to be triple the width W1, and the width W4 of the slit 80d is set to be quadruple the width W1. The widths of the other slits, not shown, are set in like ratios.

In the state of the 60 degree position shown in FIG. 13A, the slide member 80 is located at a position moved to the frontmost side like the slide member 54 mentioned above. In this state, the drive end 50a of each rotating shaft member 50 is also in a position moved to the frontmost side by abutting against the back wall of each of the slits 80a to 80d. Therefore, the keycap 22 is in the use position as mentioned above (see FIGS. 5A and 6).

When the display chassis 14 is turned from this state in the opening direction to move the slide member 80 rearward, the drive end 50a of the rotating shaft member 50 on the frontmost side, which is engaged in the slit 80a having the narrowest width, abuts against the front wall of the slit 80a to move rearward so as to make only this rotating shaft member 50 start rotating (see FIG. 13B). On the other hand, the rotating shaft members 50 engaged in the other slits 80b to 80d do not rotate because of moving inside the respective slits 80b to 80d until the drive end 50a abuts against the front wall of each of the slits 80b to 80d even when the slide member 80 moves rearward.

Therefore, when the slide member 80 moves further rearward as shown in FIG. 13C, the rotating shaft members 50 engaged in the other slits 80b to 80d start rotating in order following the rotating shaft member 50 engaged in the slit 80a on the frontmost side. In this case, the rotating shaft members 50 that have completed their rotation, i.e., the rotating shaft members 50 engaged in the slits 80a and 80b in FIG. 13C both push the keycaps 22 down to the depressed position upon completion of the rotation, and after that, the drive ends 50a are in sliding contact with the top face of the slide member 80. Thus, a keycap 22 once pushed down to the depressed position can be kept in the depressed position until another keycap 22 comes to the depressed position.

Then, when the rotation of all the rotating shaft members 50 is completed after the display chassis 14 is set at the 60 degree position, since the drive ends 50a of all the rotating shaft members 50 lie on the top face of the slide member 80, all the keycaps 22 are kept in the depressed position. Further, when the display chassis 14 is closed from the opened state, the drive ends 50a of the rotating shaft members 50 are inserted into the slits 80d to 80a in order from that on the front side, and finally at the 60 degree position, the rotating shaft members 50 return to the state shown in FIG. 13A.

Thus, the slide member 80 has the time difference structure in which the width of each of the slits 80a to 80d is made different to change the rotation timing of each rotating shaft member 50. Since this causes the timing of up-and-down motion of each row of keycaps 22 corresponding to each rotating shaft member 50 to be deviated from that of another, the load on each member of the hinge 20 and the link mechanism 56 for moving the keycaps 22 up and down is distributed. As a result, the load on each of these members can be reduced to make each member small and thin.

For example, instead of driving each rotating shaft member 50 engaged in each of the slits 80a to 80d all at different timing as mentioned above, the structure may also be such that the widths W1, W2 of adjacent slits 80a, 80b are set identical to each other, and the widths W3, W4 of the slits 80c, 80d are set identical to each other and wider than the same width W1, W2 to drive two rotating shaft members 50 simultaneously at a time.

As described above, the keyboard device 10 according to the embodiment includes the key depressing mechanism 26 having the rotating shaft member 50 provided along multiple keycaps 22 arranged side by side in the right-left direction, and the pressing piece 52 projecting from the outer circumferential surface of the rotating shaft member 50 to each keycap 22 to be able to push down the receiving piece 40 provided in the keycap 22, wherein the rotating shaft member 50 rotates about the axis to push down the receiving piece 40 through the pressing piece 52 in order to push down and keep the keycap 22 in the depressed position. Further, in the portable information equipment 12 according to the embodiment, the key depressing mechanism 26 is provided in the main body chassis 16 supporting the display chassis 14 openably and closably through the hinges 20.

In the keyboard device 10 and the portable information equipment 12, the key depressing mechanism 26 for pushing down and keeping each keycap 22 in the depressed position is composed of the rotating shaft member 50 and the pressing piece 52 mounted inside the keyboard device 10 (the main body chassis 16). Therefore, since the constituent elements of the key depressing mechanism 26 are not exposed from the keyboard device 10 and the main body chassis 16, and further from the outer surface of the display chassis 14, the quality in the appearance of a product can be ensured.

Further, the configuration is such that the rotating shaft member 50 is rotated about the axis to cause the pressing piece 52 projecting from the outer circumferential surface to push down each keycap 22. Therefore, the pressing piece 52 can push down the keycap 22 by a pressing force obtained by amplifying the rotating force of the rotating shaft member 50 with a large moment based on the projection length from the center of axle of the rotating shaft member 50 as the center of rotation to the pressing portion 52a at the tip thereof. As a result, the load on each part of the key depressing mechanism 26, the hinge 20, the link mechanism 56, and the like can be reduced, compared with the configuration for pushing down each keycap directly and forcibly by a sliding leaf spring like in Patent Document 2 mentioned above. This can not only prevent damage to each of these parts, but also make each part small and light, contributing to making the keyboard device 10 and the portable information equipment 12 thin as well.

Further, in the portable information equipment 12, the drive end 50a as the point of effort of the rotating shaft member 50 is arranged in a position offset from the base part 50b through the arm part 50c. Therefore, a moment corresponding to the length of this arm part 50c acts thereon so that the rotating shaft member 50 can be rotated by a small driving force, and hence the load on the hinge 20 and the link mechanism 56 can be further reduced.

In this case, when the receiving piece 40 is pushed down by the pressing piece 52, the top face 22a of each keycap 22 as its top surface is located in the depressed position flush with or lower than the top face of the keyboard device 10 (the top face of the frame 24 or the top face 16a of the main body chassis 16 in the embodiment), while when the depressing action of the pressing piece 52 on the receiving piece 40 is so released that the keycap 22 will return to the up position, the top face 22a projects upward from the top face of the keyboard device 10 so that the keycap 22 will be located in the use position to be movable up and down. Thus, since the keycap 22 is located in the depressed position in a state where use of the keyboard device 10 is not required, e.g., in a state where the portable information equipment 12 is at the 0 degree position or the 360 degree position, the thickness of the portable information equipment 12 can be made as thin as possible. On the other hand, since the keycap 22 is located in the use position in a state where use of the keyboard device 10 is required, e.g., in a state where the portable information equipment 12 is set to a 150 degree position from the 90 degree position, the user can carry out the depressing operation of the keycap 22 with a sufficient up-and-down stroke, thus achieving high operability.

Multiple rotating shaft members 50 are provided along the front side or the rear side of the keycaps 22 arranged side by side in the right-left direction, and arranged side by side in the front-rear direction. Thus, since each row of keycaps 22 can be pushed down by a common rotating shaft member 50, the number of parts of the key depressing mechanism 26 can be reduced, and hence the structure can be simplified.

The key depressing mechanism 26 has the time difference structure in which the rotation timing of each row or two or more rows of rotating shaft members 50 arranged side by side in the front-rear direction is made different to change the timing of pushing down each row or two or more rows of keycaps 22 in the front-rear direction. Since this causes the load on each member of the hinge 20 and the link mechanism 56 for moving each row of keycaps 22 up and down to be distributed, the load can be reduced, and hence the configuration can be made smaller and thinner. Further, use of such a time difference structure causes the keycaps 22 to move upward wavily in order from the front row of keycaps 22 according to an increase in the angle of opening of the display chassis 14 when the display chassis 14 is opened, for example, from the 0 degree position so as to return to the use position. Similarly, when the display chassis 14 is closed, for example, from the 90 degree position, the keycaps 22 are moved downward wavily in order from the rear row of keycaps 22 according to a decrease in the angle of opening of the display chassis 14 so as to be located at the depressed position. Thus, a visual performance effect can be given to the user.

Further, in the portable information equipment 12 as a convertible PC, the keycaps 22 are kept at the depressed position in the 0 degree position and the 360 degree position. On the other hand, in a predetermined angle range set between the 0 degree position and the 180 degree position (between the 60 degree position and the 180 degree position in the embodiment), the depressing action of the pressing piece on the receiving piece 40 is released to cause the keycaps 22 to return to the up position as the use position to be movable up and down. Thus, in the 0 degree position and the 360 degree position, where the keyboard device 10 is not required and it is desired to make the keyboard device 10 as thin as possible or as flat as possible, the keycap 22 comes to the depressed position, while in the predetermined angle range set between the 0 degree position and the 180 degree position, where the keyboard device 10 is required, the keycap 22 comes to the use position, thus achieving high convenience.

In a substantially similar way, when the portable information equipment 12 is used as a typical laptop PC as mentioned above, the hinge 20 is required to couple the main body chassis 16 and the display chassis 14 tunably from the 0 degree position to at least about the 90 degree position. In this case, the keycaps 22 are kept a the depressed position in the 0 degree position, and in a predetermined angle position set between the 0 degree position and the 90 degree position (the 60 degree position in the embodiment), the depressing action of the pressing piece 52 on the receiving piece 40 is released to cause the keycaps 22 to return to the up position as the use position to be movable up and down.

Note that the present invention is not limited to the embodiment mentioned above, and changes can of course be made freely without departing from the spirit of the present invention.

In the aforementioned embodiment, the structure in which the rotating shaft member 50 is arranged along the rear side of the keycap 22 to be depressed is illustrated, but the rotating shaft member 50 may be arranged along the front side of the keycap 22 to be depressed, or arranged both on the front and rear sides. Further, the rotating shaft member 50 may be provided along the front-rear direction at the side of the keycap 22 laid out in the front-rear direction depending on the layout specification of the key switches 21.

In the aforementioned embodiment, for example, a keycap 22 at the depressed position in the 0 degree position is placed at the use position in the 60 degree position, but the switching angle of the depressing operation of this keycap 22 may of course be any angle other than the 60 degree position. However, since use of the keyboard device 10 in an angle range of about the 90 degree position to the 150 degree position is typically required for the laptop PC or the convertible PC, it is preferable that the switching angle should be an angle position smaller than at least the 90 degree position and larger than the 0 degree position.

As has been described, the present disclosure provides an improved keyboard device for portable information equipment.

While the disclosure has been particularly shown and described with reference to a preferred embodiment, it will be understood by those skilled in the art that various changes in form and detail may be made therein without departing from the spirit and scope of the disclosure.

What is claimed is:

1. A portable information equipment comprising:
a main body chassis;
a display chassis coupled to said main body via a hinge;
a keyboard device located within said main body chassis, wherein said keyboard device includes
a plurality of keycaps elastically supported to be moved up and down;
a key depressing mechanism having a rotating shaft member provided along at least one of said keycaps, wherein said rotating shaft member includes at least one bend; and
a pressing piece projecting from said rotating shaft member to a side of said at least one keycap to depress downward a receiving part provided in said at least one keycap, wherein said rotating shaft member rotates about an axis to cause said pressing piece to push down said receiving part and, in turn, pushing down and keeping said at least one keycap in a depressed position.

2. The portable information equipment of claim 1, wherein when said receiving part is pushed down by said pressing piece, said at least one keycap is placed in said depressed position where a top face of said at least one keycap is flush with or lower than a top face of said keyboard device.

3. The portable information equipment of claim 1, wherein when depressing action of said pressing piece on said receiving part is released to cause said at least one keycap to return to a use position to be moved up and down.

4. The portable information equipment of claim 1, wherein a plurality of said rotating shaft members are provided along a front side of said keycaps arranged side by side in a right-left direction so that said rotating shaft members will be arranged side by side in a front-rear direction.

5. The portable information equipment of claim 4, wherein said key depressing mechanism has a time difference structure in which rotation timing of each row or every two or more rows of said rotating shaft members arranged side by side in said front-rear direction is made different to change timing of pushing down each row or every two or more rows of said keycaps in said front-rear direction.

6. The portable information equipment of claim 1, further comprising a link mechanism for rotating said rotating shaft member in conjunction with a rotating operation of said hinge when said display chassis is moved with respect to said main body chassis.

7. The portable information equipment of claim 4, further comprising
a link mechanism for rotating said rotating shaft member in conjunction with a rotating operation of said hinge when said display chassis is moved with respect to said main body chassis, wherein said link mechanism includes a slide member in which a plurality of slits are so provided that an end of each rotating shaft member is engaged in each of said slits to move in said front-rear direction in conjunction with said rotating operation of said hinge in order to rotate said rotating shaft member.

8. The portable information equipment of claim 1, wherein
said hinge is to couple said main body chassis and said display chassis turnably from a 0 degree position, where front faces of said main body chassis and said display chassis face each other, to a 360 degree position, where back faces of said main body chassis and said display chassis face each other, via a 180 degree position, where said front faces of said main body chassis and said display chassis are parallel to each other while facing in the same direction; and
said at least one keycap is kept in said depressed position at said 0 degree position and said 360 degree position, and in a predetermined angle range set between said 0 degree position and said 180 degree position, said depressing action of said pressing piece on said receiving part is released to cause said at least one keycap to return to an up position and hence to be placed in a use position to be moved up and down.

9. The portable information equipment of claim 8, wherein
said hinge is to couple said main body chassis and said display chassis turnably from a 0 degree position, where front faces of said main body chassis and said display chassis face each other, to at least a 90 degree position where said main body chassis and said display chassis are orthogonal to each other; and
said at least one keycap is kept in said depressed position at said 0 degree position, and at a predetermined angle position set between said 0 degree position and said 90 degree position, said depressing action of said pressing piece on said receiving part is released to cause said at least one keycap to return to an up position and hence to be placed in a use position to be moved up and down.

10. A keyboard device comprising:
a plurality of keycaps elastically supported to be moved up and down;
a key depressing mechanism having a rotating shaft member provided along at least one of said keycaps, wherein said rotating shaft member includes at least one bend; and
a pressing piece projecting from said rotating shaft member to a side of said at least one keycap to depress downward a receiving part provided in said at least one keycap, wherein said rotating shaft member rotates about an axis to cause said pressing piece to push down said receiving part and, in turn, pushing down and keeping said at least one keycap in a depressed position.

11. The keyboard device of claim 10, wherein when said receiving part is pushed down by said pressing piece, said at least one keycap is placed in said depressed position where a top face of said at least one keycap is flush with or lower than a top face of said keyboard device.

12. The keyboard device of claim 10, wherein when depressing action of said pressing piece on said receiving part is released to cause said at least one keycap to return to a use position to be moved up and down.

* * * * *